(12) United States Patent
Friedrich et al.

(10) Patent No.: US 8,573,851 B2
(45) Date of Patent: Nov. 5, 2013

(54) NEEDLE ROLLER BEARING WITH RIMLESS INNER RING

(75) Inventors: Peter Friedrich, Auernheim (DE);
Michael Krueger, Schweinfurt (DE);
Reinhart Malik, Herzogenaurach (DE);
Steffen Saebsch, Weisendorf (DE);
Heinz Schaefers, Erlangen (DE);
Matthias Fick, Schnaittach (DE);
Manfred Winkler, Aurachtal (DE);
Johannes Enders, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/369,418

(22) Filed: Feb. 9, 2012

(65) Prior Publication Data
US 2012/0207423 A1   Aug. 16, 2012

(30) Foreign Application Priority Data
Feb. 16, 2011  (DE) .......................... 10 2011 004 200

(51) Int. Cl.
*F16C 33/46*  (2006.01)
*F16C 33/58*  (2006.01)
*F16C 43/04*  (2006.01)

(52) U.S. Cl.
USPC .................... 384/572; 384/560; 384/654

(58) Field of Classification Search
USPC ......... 384/456, 457, 548, 560, 561, 571–578, 384/580, 564
See application file for complete search history.

(56) References Cited

U.S. PATENT DOCUMENTS

| | | | | | |
|---|---|---|---|---|---|
| 2,658,807 | A | * | 11/1953 | Wallgren | 384/571 |
| 4,523,862 | A | * | 6/1985 | Yasui et al. | 384/564 |
| 2010/0074569 | A1 | * | 3/2010 | Matsushita | 384/571 |
| 2010/0209036 | A1 | * | 8/2010 | Ueno | 384/571 |

FOREIGN PATENT DOCUMENTS

| | | | |
|---|---|---|---|
| DE | 3732404 A1 | * | 3/1988 |
| DE | 196 46 310 A1 | | 5/1998 |
| JP | 07012138 A | * | 1/1995 |

* cited by examiner

*Primary Examiner* — Phillip A Johnson
(74) *Attorney, Agent, or Firm* — Lucas & Mercanti, LLP

(57) ABSTRACT

A needle roller bearing, which has a rimless inner ring or a rimless inner ring bushing and a plurality of rolling elements that are arranged and rotatable in the cage. For coherence of the needle roller bearing after manufacturing and for mounting in an installation space, the cage has, at least on one front end, a radially inward pointing retaining device and the inner ring or the inner ring bushing has a retaining element on its outer periphery that cooperates with the retaining device.

2 Claims, 1 Drawing Sheet

NEEDLE ROLLER BEARING WITH RIMLESS INNER RING

CROSS-REFERENCE TO RELATED APPLICATIONS

This application claims priority of DE 10 2011 004 200.8 filed Feb. 16, 2011, which is incorporated by reference herein.

FIELD OF THE INVENTION

The invention relates to a needle roller bearing, which has a rimless inner ring or a rimless inner ring bushing and a plurality of rolling elements received for rotation in a cage.

BACKGROUND OF THE INVENTION

Needle roller bearings with different configurations are known. Because a needle roller bearing is a classical movable bearing, the inner ring of such a bearing typically does not comprise a rim, and the outer bearing ring takes over the function of an axial guidance of the needle rollers. However, an inverted design of such bearings is also known. For mounting such a needle roller bearing, the rolling elements received in a cage are usually pushed axially onto the raceway of the inner bearing ring, or onto the raceway of an inner bushing. In case of use in automatic transmissions, the pilot bearings are needle roller bearings with inner bushings. The mounting of such bearings is often very difficult for the user because the design space available for the installation of a pilot bearing is very limited both in radial and in axial direction.

DE 196 46 310 A1 describes a radial rolling bearing comprising cylindrical rolling elements. In this bearing, the outer ring has, on both axial ends, radially inwardly directed stop rims for a pocket-type cage to prevent an axial movement of the cage.

SUMMARY OF THE INVENTION

The invention is directed to a needle roller bearing, which comprises a rimless inner rim and a cage that is fixed in an axial direction and does not necessitate a complex installation.

The invention is based on the knowledge that, for facilitating the handling and simplifying the installation of the needle roller bearing at the mounting point, the cage can be configured, independently of the geometry of the outer ring of the needle roller bearing, such that the cage is fixed loosely on the inner ring but with adequate coherence.

Thus, the invention broadly relates to a rimless needle roller bearing, which comprises an inner ring or an inner ring bushing and a plurality of rolling elements that are received for rotation in a cage. The cage has a radially inward pointing retaining device on at least one front end and the inner ring or the inner ring bushing has a retaining element cooperating with the radially inward pointing retaining device on an outer periphery.

Through this construction, the cage, which is equipped with bearing needle rollers is retained axially on the inner ring of the bearing to prevent the bearing needle rollers from falling out of the cage. This enables not only a comparatively reliable handling, stocking and transportation of the composite component prior to installation in its destined place of installation, for example in a housing of a transmission, but also facilitates its installation as such.

In a first embodiment, the retaining element on the inner ring or on an inner ring bushing is configured as a radially outward pointing annular web or a plurality of annular web segments. The retaining element is neither destined nor designed to support axial forces of the rolling elements directly and, therefore, does not constitute an annular rim of the bearing. The retaining device of the cage engages over the retaining element on the inner ring or on the inner ring bushing axially and radially inwards with lash so that a certain axial movability of the cage within the bearing is guaranteed.

In a second form of embodiment, the retaining element on the inner ring or on the inner ring bushing is an annular groove or a ring-shaped sink. This recess in the inner ring or in the inner ring bushing can also be configured as a ring-shaped step on the front end of the inner ring or of the inner ring bushing.

In order to be able to guarantee a firm axial retention of the cage on the inner ring or on the inner ring bushing in the second embodiment as well, according to another proposition of the invention, the dimensions of the radially inward pointing retaining device of the cage and the dimensions of the associated retaining element on the inner ring or on the inner ring bushing are chosen so that the retaining device of the cage engages into the retaining element of the inner ring or of the inner ring bushing with radial lash.

BRIEF DESCRIPTION OF THE DRAWINGS

The needle roller bearing configured according to the invention will be described in the following two embodiments and with reference to the appended drawings.

DETAILED DESCRIPTION OF THE INVENTION

Figure 1:
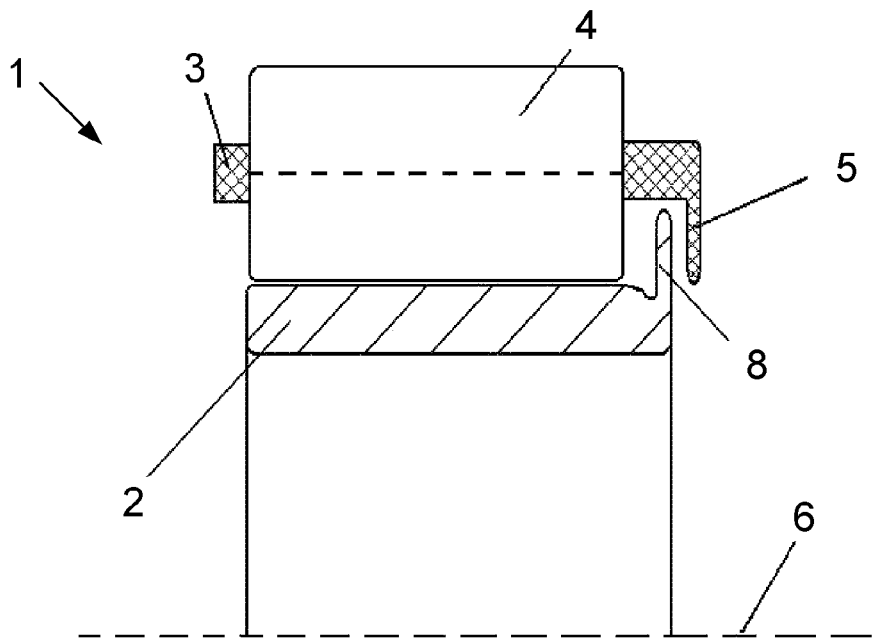
FIG. 1 shows a partial longitudinal section through a needle roller bearing of the invention according to a first form of embodiment.

FIG. 1 shows a needle roller bearing 1 according to the invention substantially comprising an inner ring 2, a cage 3 and needle-shaped rolling elements 4. A ring-shaped retaining device 5 is configured on one axial end of the cage 3. This retaining device 5 is bent at an angle of 90° and points radially inwards. Adjacent to the retaining device 5 of the cage 3, but slightly offset in axial direction, the inner ring 2 comprises a radially outwards pointing, comparatively narrow retaining element 8 that is configured in the present case as a continuous annular web on the front end of the inner ring 2. The retaining device 5 of the cage 3 and the retaining element 8 of the inner ring 2 possess a radial length such that they overlap each other partially, in the region of overlap of these two retaining parts 5 and 8, these comprise a slight axial and radial lash so that the cage 3 is substantially fixed in axial direction, but the cage 3 can still rotate freely about the rolling bearing axis 6.

Figure 2:
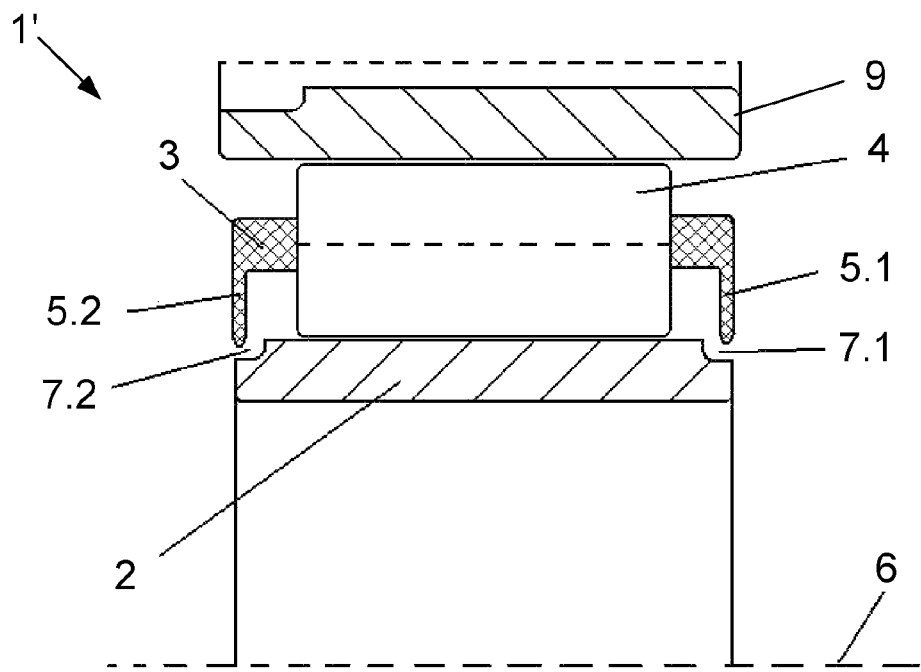
FIG. 2 shows a partial longitudinal section through a needle roller bearing of the invention according to a second form of embodiment.

While FIG. 1 shows a needle roller bearing 1 comprising a retaining device on one side of the cage, and the inner ring 2, FIG. 2 illustrates a needle roller bearing 1' comprising a retaining device on two sides. A further difference in the needle roller bearing 1' according to the invention is that the inner ring 2 comprises on each of its two front ends, a retaining element in the form of step-shaped recesses 7.1, 7.2 or annular grooves into each of which an angularly bent and radially inwards pointing retaining element 5.1 and 5.2 respectively of the cage 3 engages to thus fix the cage 3 in axial direction. In this case, too, there exists a slight axial and radial lash between the angularly bent retaining elements 5.1, 5.2 of the cage 3 and the recesses 7.1, 7.2 of the inner ring 2 so that the cage can rotate freely and no, or only slight friction occurs between the two components during operation.

Due to the geometry of its components, the needle roller bearing 1, 1' according to the invention requires only a comparatively small design space and, because of the coherence of the inner ring, the cage and the rolling elements, the inventive bearing can be installed in a more simple manner than a conventional needle roller bearing, for example as a pilot bearing in an automatic transmission.

According to FIG. 2, the needle roller bearing 1' can also comprise an outer ring 9. In such a form of embodiment, it would also be possible to arrange the aforesaid retaining means not the inner ring, but on the outer ring so that the retaining means of the cage would then point radially outwards.

It is also possible for the cage 3 to comprise one or more radially inwards pointing recesses into which one or more retaining devices of the inner ring 2 protrude to thus realize the function described above.

List of Reference Numerals

1 Needle Roller Bearing
2 Inner Ring
3 Cage
4 Rolling Elements
5 Retaining Device of the Cage
5.1 Retaining Device of the Cage
5.2 Retaining Device of the Cage
6 Bearing Axis
7.1 Retaining Element on Inner Ring
7.2 Retaining Element on Inner Ring
8 Retaining Element on Inner Ring
9 Outer Ring

What is claimed:

1. A needle roller bearing, comprising:
a cage having a radially inwardly pointing retaining device on at least one front end of the cage
a plurality of roiling elements arranged in the cage; and
a rimless inner ring or a rimless inner ring bushing having a retaining element on an outer periphery of the rimless inner ring or the rimless inner ring bushing that cooperates with the retaining device of the cage, wherein the retaining device of the cage engages over the retaining element on the inner ring or on the inner ring bushing with a lash in an axial and a radially inward direction, and
wherein the retaining element on the inner ring or on the inner ring bushing is a radially outwardly pointing annular web or a plurality of radially outwardly pointing annular web segments.

2. The needle roller bearing according to claim 1, wherein the retaining device of the cage and the retaining element on the inner ring or on the inner ring bushing are dimensioned so that the retaining device of the cage engages into the retaining element of the inner ring or the inner ring bushing with a radial lash.

* * * * *